(12) United States Patent
Jenkins et al.

(10) Patent No.: US 11,485,665 B2
(45) Date of Patent: Nov. 1, 2022

(54) MOULD PAIR HAVING ALIGNMENT SURFACES

(71) Applicant: Facebook Technologies, LLC, Menlo Park, CA (US)

(72) Inventors: Kurt Jenkins, Sammamish, WA (US); Michael Patrick Schaub, Redmond, WA (US); Byron Taylor, Sammamish, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 222 days.

(21) Appl. No.: 16/712,805

(22) Filed: Dec. 12, 2019

(65) Prior Publication Data

US 2020/0299170 A1 Sep. 24, 2020

Related U.S. Application Data

(60) Provisional application No. 62/922,234, filed on Mar. 22, 2019.

(51) Int. Cl.
*C03B 11/08* (2006.01)

(52) U.S. Cl.
CPC .......... *C03B 11/08* (2013.01); *C03B 2215/60* (2013.01)

(58) Field of Classification Search
CPC .................................................. B29D 11/005
See application file for complete search history.

(56) References Cited

U.S. PATENT DOCUMENTS

| 2003/0033833 | A1* | 2/2003 | Fujimoto | C03B 11/08 65/102 |
| 2004/0206121 | A1* | 10/2004 | Autery | C03C 3/321 65/83 |
| 2007/0210466 | A1 | 9/2007 | Saeki et al. | |
| 2007/0212438 | A1* | 9/2007 | Saeki | B29C 43/36 425/408 |
| 2009/0183527 | A1* | 7/2009 | Chang | B29C 43/021 65/305 |
| 2012/0014001 | A1 | 1/2012 | Kurihara | |
| 2020/0247703 | A1* | 8/2020 | Oomori | C03B 7/084 |

FOREIGN PATENT DOCUMENTS

| KR | 101310801 B1 | 9/2013 |
| KR | 101310807 B1 | 9/2013 |

OTHER PUBLICATIONS

PCT/US2020/023505 Search Report dated Jun. 29, 2020.

* cited by examiner

*Primary Examiner* — Lisa L Herring
(74) *Attorney, Agent, or Firm* — Pequignot + Myers; Matthew A. Pequignot (57) ABSTRACT

A pair of moulds for moulding an optical component is disclosed. The pair of moulds includes a first mould having a first surface, and a second mould having a second surface. The first surface includes a moulding portion for moulding a first optical surface of the optical component, and an alignment portion for alignment with the second mould. The alignment portion extends around the moulding portion. The second surface includes a moulding portion for moulding a second, opposite optical surface of the optical component, and an alignment portion for alignment with the first mould via a contact with the alignment portion of the first surface. When the moulds are brought together, they self-align. A corresponding moulding apparatus and a method may use the mould pair to manufacture various optical components.

18 Claims, 5 Drawing Sheets

МOULD PAIR HAVING ALIGNMENT SURFACES

REFERENCE TO RELATED APPLICATION

The present application claims the benefit of U.S. Provisional Application No. 62/922,234, filed on Mar. 22, 2019, entitled MOULD PAIR HAVING ALIGNMENT SURFACES OF REVOLUTION, and incorporated herein by reference in its entirety.

TECHNICAL FIELD

The present disclosure relates to optical manufacturing, and in particular to moulding various optical components such as lenses, for example.

BACKGROUND

First lenses and mirrors have been manufactured using processes of grinding and polishing. Rubbing two substrates against each other naturally results in a flat or spherical surface of both substrates, because only flat and spherical surfaces can remain in full contact when turned and pressed against each other during grinding and polishing action. Grinding and polishing/lapping remain the most frequently used methods to manufacture lenses and mirrors for optical applications till this day.

Conventional lens grinding and polishing processes have their inherent limitations. First, they are time-consuming; and second, they are mostly limited to spherical surfaces. Other important optical surfaces, such as paraboloids, ellipsoids, and hyperboloids, are much more difficult to produce using grinding and polishing, because these surfaces do not repeat themselves when turned and shifted in a grinding/lapping round motion. Such complex surfaces usually require special techniques of manufacturing, e.g. localized grinding/polishing using a computerized polishing/grinding machines, which can provide different amount of polishing for different radial portions of a lens or mirror. Localized grinding and polishing makes aspherical lenses and mirrors time-consuming and expensive to manufacture.

Moulding of optical elements has been proposed in an attempt to reduce time and cost to manufacture optical surfaces of lenses and mirrors. Moulding materials may include glass or plastic, for example. In a typical precision glass moulding process, a glass preform—termed "gob"—is placed between two moulds, which are rigid bodies having a precisely machined mould surface matching a desired exact optical surface shape of an optical component to be moulded. The gob is heated until pliable, and the moulds are brought together with a controllable amount of displacement, and with their mould surfaces pressing against the gob to give it a desired shape.

Once precision glass moulding process and tools have been developed, the moulding has a great advantage over conventional production techniques such as grinding and polishing. The majority of moulded lens quality characteristics are tool-bound, meaning that the moulded optical elements usually have only insignificantly small deviations from one to another. For example, an important characteristic of a lens is the shape of its optical surfaces, i.e. surface sag. Moulded lenses have a very repeatable surface sag. On the other hand, other lens parameters, such as centration of moulded lens surfaces relative to each other, may remain subject to process variations.

SUMMARY

In accordance with the present disclosure, there is provided a pair of moulds for moulding an optical component. The pair of moulds includes a first mould comprising a first surface and a second mould comprising a second surface. The second surface includes a moulding portion for moulding a second optical surface of the optical component opposing the first optical surface thereof, and an alignment portion for alignment with the first mould via a contact with the alignment portion of the first surface. The alignment portion extends around the moulding portion.

In some embodiments, the alignment portions of the first and second surfaces include surfaces of revolution. For example, the alignment portion of the first surface may include a concave truncated conical surface, and the alignment portion of the second surface may include a convex truncated conical surface matched to the concave truncated conical surface of the alignment portion of the first surface. The alignment portions of the first and second surfaces are not limited to surfaces of revolution. Using diamond turning with fast and/or slow tool servos, almost any shape can be fabricated, including anamorphic and freeform surfaces. As these are also turned in a single setup if desired, they can be extremely well centered to the alignment features of the mold.

The moulding portions of the first and second surfaces may be completely and continuously surrounded by the respective alignment portions. The alignment portion of the first surface surrounding the moulding portion of the first surface may be axially symmetrical about a first axis, and the alignment portion of the second surface surrounding the moulding portion of the second surface may be axially symmetrical about the first axis.

In some embodiments, each one of the first and second surfaces may include a straight portion surrounding the respective alignment portion. The moulding portions of the first and second surfaces may include concave surfaces, and/or aspheric surfaces. The alignment portions of the first and second surfaces may include diamond turned surfaces. The entire first and second surfaces may be diamond turned for better precision.

In accordance with the present disclosure, there is provided a moulding apparatus for moulding an optical component. The moulding apparatus includes a first mould comprising a first surface, a second mould comprising a second surface, a mould support for supporting the first and second moulds such that the first and second surfaces are facing each other, and a press apparatus for pressing the first and second moulds against each other for alignment. The first surface includes a moulding portion for moulding a first optical surface of the optical component, and an alignment portion for alignment with the second mould. The second surface includes a moulding portion for moulding a second optical surface of the optical component opposing the first optical surface, and an alignment portion for alignment with the first mould via a contact with the alignment portion of the first surface. The alignment portion extends around the moulding portion.

In some embodiments of the moulding apparatus, the alignment portions of the first and second surfaces include surfaces of revolution. For example, the alignment portion of the first surface may include a concave truncated conical surface, and the alignment portion of the second surface may include a convex truncated conical surface matched to the concave truncated conical surface of the alignment portion of the first surface. In some embodiments, the moulding portions of the first and second surfaces are fully surrounded by the respective alignment portions.

Each one of the first and second surfaces may include a straight portion surrounding the respective alignment portion. The moulding portions of the first and second surfaces may include concave surfaces, freeform surfaces, anamorphic surfaces, aspheric surfaces, etc. The alignment portions of the first and second surfaces may include diamond turned surfaces.

In accordance with the present disclosure, there is further provided a method for manufacturing an optical component. The method may include placing an optical component preform between a moulding portion of a first surface of a first mould and a moulding portion of a second surface of a second mould. The first surface includes an alignment portion for alignment with the second mould, and the second surface includes an alignment portion for alignment with the first mould. The alignment portions extend around the corresponding moulding portions. The method may further include pressing the first and second moulds against each other such that the alignment portions of the first and second surfaces engage each other, thereby aligning the first and second moulds to each other. The pressing may be performed with a controllable amount of pressure.

In some embodiments, the alignment portion of the first surface includes a concave truncated conical surface, and the alignment portion of the second surface includes a convex truncated conical surface matched to the concave truncated conical surface. As the first and second moulds are pressed against each other, the convex truncated conical surface engages the concave truncated conical surface, thereby self-registering the first and second moulds such that the convex and concave truncated conical surfaces are coaxial. The first and second surfaces may be manufactured by diamond turning for extra precision. The method may further include heating the optical component preform above a glass transition temperature of the optical component preform before pressing.

In some embodiments, the optical component material comprises molten glass or plastic. In some embodiments, the optical component material comprises a heated solid-state glass preform. At least one of the first or second moulds may be nickel-plated.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1 to 6, similar reference numerals refer to similar elements.

One important characteristic of an optical element having two curved optical surfaces is a mutual centration of the optical surfaces. For example, two refractive surfaces of a lens need to be precisely aligned to each other to avoid increasing optical aberrations of the lens. Centration of a moulded lens surface depends on the centration of moulds themselves. Moulds may be centered with a set of precision pins and matching holes. However, for optical elements with highly curved surfaces, e.g. small high numerical aperture lenses, pin-based centering may provide insufficient level of precision.

In accordance with the present disclosure, a pair of moulds may each include a surface having an alignment portion and a moulding portion. The surface may be obtained, for example, by diamond turning. Due to the nature of shaping a surface e.g. in a single setup of the diamond turning machine, the alignment portion and the moulding portion are aligned to each other with a high degree of precision. The alignment portions of the surfaces of the moulds of the pair may be matched to each other. For example, the alignment portions of the surfaces may include matched truncated conical surfaces, a convex and a concave ones. When inserted into one another, the conical surfaces self-align ensuring a precision centration of the respective moulding portions. While surfaces of revolution may be preferred, other alignment shapes are possible. The alignment portion of the surface may extend around the moulding portion of the surface, i.e. extend continuously around the corresponding moulding portion.

Figure 1:
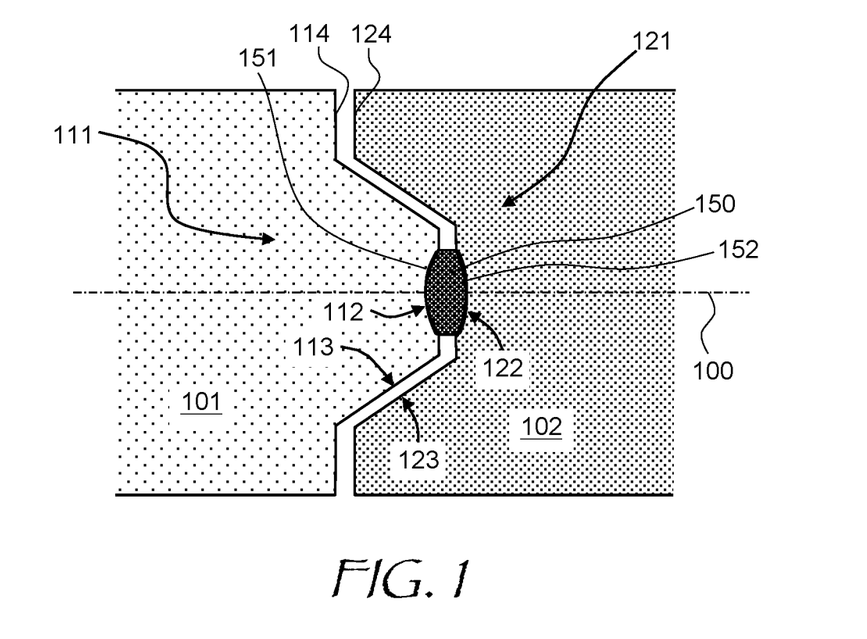
FIG. 1 is a side cross-sectional view of a pair of moulds of the present disclosure.

Referring to FIG. 1, a pair of moulds for moulding an optical component 150, such as a lens, includes a first mould 101 having a first surface 111 and a second mould 102 having a second surface 121. The first surface 111 includes a moulding portion 112 for moulding a first optical surface 151 of the optical component 150, and an alignment portion 113 for alignment with the second mould 102. The second surface 121 comprises a moulding portion 122 for moulding a second, opposed optical surface 152 of the optical component 150, and an alignment portion 123 for alignment with the first mould 101 via a contact with the alignment portion 113 of the first surface 111.

In some embodiments, the first 111 and second 121 surfaces are surfaces of revolution. Herein, the term "surface of revolution" means a surface which can be obtained by rotating an arbitrary curve about an axis of rotation. For example, in the embodiment shown in FIG. 1, the curve for the first surface 111 may be is a contour of the first mould 101 rotated about an axis 100, and accordingly, the curve for the second surface 121 may be a contour of the second mould 102 rotated about the same axis 100, i.e. the first 111 and second 121 surfaces are coaxial when aligned. The moulding portions 112, 122 of the first 111 and second 121 surfaces may include concave or convex surfaces of revolution for forming a spherical lens, an aspheric lens, a Fresnel lens, a diffractive lens, a bi-convex lens, a bi-concave lens, a concave-convex lens, a conical optical element, or any other optical element having two coaxial surfaces of revolution. The moulding portions of the first 111 and second 121 surfaces do not need to be surfaces of revolution. By using diamond turning with fast and/or slow tool servos, almost any shape may be fabricated.

As illustrated in FIG. 1, the moulding portions of the first 111 and second 112 surfaces are surrounded by the respective alignment portions 113, 123 extending continuously, i.e. without gaps, around the moulding portions 112, 122. Each one of the first 111 and second 121 surfaces may include a straight portion surrounding the respective alignment portion. By way of an illustrative example, the first surface 111 may include a straight portion 114 surrounding the alignment portion 113, and the second surface 121 may include a straight portion 124 surrounding the respective alignment portion 123.

Figure 2:
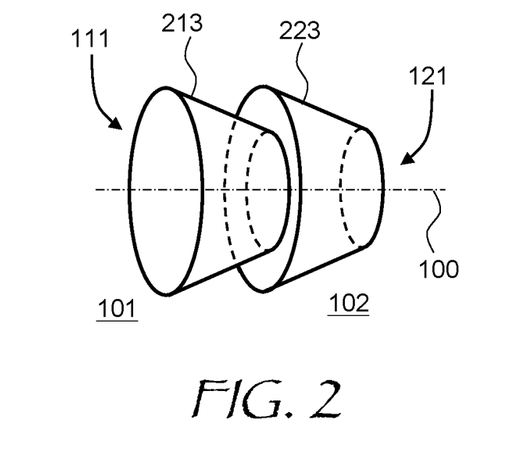
FIG. 2 is a three-dimensional view of conical alignment portions of surfaces of the moulds of FIG. 1.

Referring to FIG. 2 with further reference to FIG. 1, the alignment portion 113 of the first surface 111 of the first mould 101 may include a concave truncated conical surface 213, and the alignment portion 123 of the second surface 121 of the second mould 102 may include a convex truncated conical surface 223 matched to the concave truncated conical surface 213 of the alignment portion 113 of the first surface 111. During the process of self-alignment, the concave truncated conical surface 213 of the first surface 111 of the first mould 101 is inserted into the convex truncated conical surface 223 of the second surface 121 of the second mould 102, as shown in FIG. 2. When the two conical surfaces 213 and 223 engage each other in a physical contact, the first 111 and second 121 surfaces self-align to one another and become coaxial with the common axis 100, thereby aligning the respective moulding portions 112 and 122. Since an entire surface can be manufactured during a same pass of a diamond tool of a diamond turning machine, or a cutting or shaping tool of a precision lathe, a very precise alignment of the respective moulding portions 112 and 122 of the first 111 and second 121 surfaces of the first 101 and second 102 moulds, respectively, may be achieved.

Figure 3:
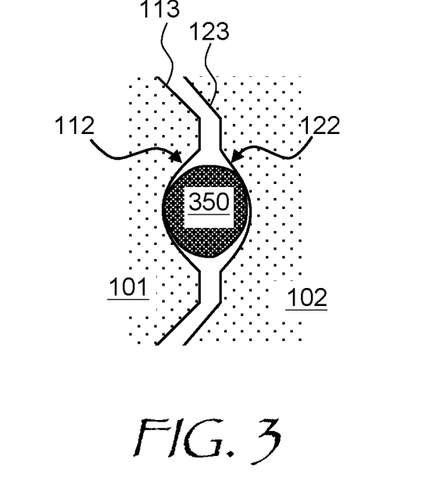
FIG. 3 is a side cross-sectional view of a preform placed between the pair of moulds of FIG. 1.

The moulding action for manufacturing of the optical component 150, e.g. a lens, is further illustrated in FIG. 3. A glass or plastic gob 350 is placed between the first 101 and second 102 moulds and optionally heated above its glass transition temperature Tg. As the first 101 and second 102 moulds are brought together, the gob 350 is squeezed by the moulding portions 112 and 122 of the first 111 and second 121 surfaces of the first 101 and second 102 moulds. The first 101 and second 102 moulds are self-aligned when the alignment portions 113 and 123 of the first 111 and second 121 surfaces engage one another in a physical contact.

When the alignment portions 113 and 123 of the first 111 and second 121 surfaces engage one another, the distance between the moulding portions 112 and 122 of the center thickness of the first 111 and second 121 surfaces reaches a minimum pre-defined distance, thereby defining the center thickness of the squeezed gob 350. Then, the glass gob 350 may be cooled down and removed from the grip of the moulds 101, 102. Since the thickness of the squeezed gob 350 is well-defined by the shape of the first 111 and second 121 surfaces, the center thickness of the manufactured optical component 150 is well-defined. Both the center thickness and the surface shapes of the manufactured optical component 150 are tool-bound, that is, defined by the pair of moulds 101, 102. Since the moulds 101, 102 are self-aligning, the centration error of the first 151 and second 152 optical surfaces is also tool-bound.

The first 101 and second 102 moulds may also be adapted for an injection moulding or a casting process, in which the first 101 and second 102 moulds are brought together, and a moulding material, such as a low-temperature glass or a plastic, is injected into the cavity between the moulding portions 112, 122. The moulding material may be thermally or UV curable, for example.

The first 101 and second 102 moulds may be manufactured using suitable techniques for forming precision surfaces of a desired shape, including surfaces of revolution. For example, a lathe or a diamond turning machine may be used to manufacture the first 111 and second 121 surfaces of the first 101 and second 102 moulds, respectively. The entire surfaces 111 and 121 may be diamond turned, or at least the alignment portions 113, 123 of the first 111 and second 121 surfaces may be diamond turned. It is to be understood, however, that the optical components to be moulded may include surfaces other than surfaces of revolution, e.g. microlens arrays, or any other arrayed elements, diffraction gratings, etc. Anamorphic and freeform surfaces may be fabricated by diamond turning with fast/slow servos. As these are also turned in a single setup if desired, they can be extremely well centered to the alignment features of the mold.

Figure 4:
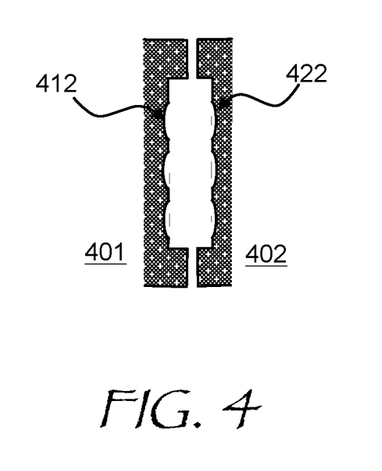
FIG. 4 is a side cross-sectional view of an embodiment of moulding portions of the moulds of FIG. 1.

In some embodiments, the moulding surface portions may be made flat, and then required shapes, e.g. those of microlens arrays, may be precision milled into the flat moulding surface portions. The microlens arrays may be linear, rectangular, hexagonal, etc. Any non-rotationally symmetrical optical surfaces may be moulded this way. As an example, FIG. 4 shows moulding portions 412, 422 of moulds 401, 402 for moulding microlens arrays. The moulding portions 412, 422 may include arrays of concave recesses for moulding individual convex microlenses, as illustrated. Protrusions may be used instead of recesses to create corresponding concave surfaces of the microlenses.

While an excellent centration between the lens surfaces is desirable in most cases, it is also possible to achieve a required offset between the surfaces by machining the optical surfaces with a controlled amount of decenter to the alignment features. This could be useful for some optical configurations. One may also obtain a defined offset between the optical surface and mechanical alignment features that could be integrally molded into the lens.

The alignment portions of the moulds surfaces are not limited to truncated conical surfaces of FIGS. 1 and 2. For example, referring to FIG. 5, first 501 and second 502 moulds have first 511 and second 521 surfaces of revolution, respectively. Both surfaces of revolution 511 and 521 are symmetrical about an axis 500. The first surface of revolution 511 includes a concave moulding portion 512 and a grooved alignment portion 513 extending continuously, i.e. without gaps, around the concave moulding portions 512. The grooved alignment portion 513 includes a pair of circular grooves symmetrical about the axis 500 and having a triangular cross-section. The second surface of revolution 521 includes another concave moulding portion 522 and a ridged alignment portion 523 extending continuously around the other concave moulding portions 522. The ridged alignment portion 523 includes a pair of circular ridges symmetrical about the axis 500 and having a triangular cross-section. When the first 501 and second 502 moulds are brought together, the first 511 and second 521 surfaces of revolution engage each other, thereby causing the surfaces of revolution 511 and 512 of the first 501 and second 502 to be coaxial, i.e. symmetrical about the same axis 500.

Figure 5:
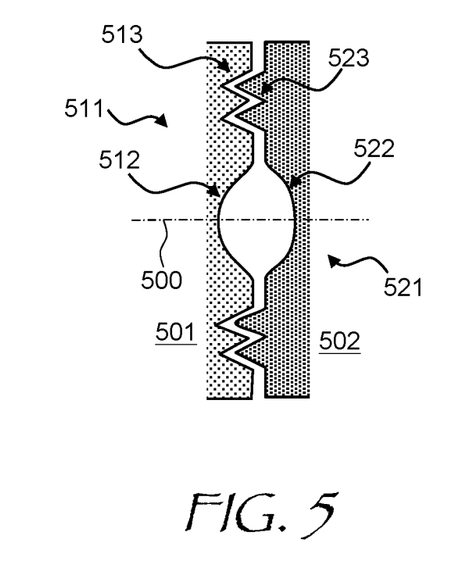
FIG. 5 is a side cross-sectional view of an embodiment of alignment portions of the moulds of FIG. 1.

In some embodiments, the grooved alignment portion 513 may include grooves having slanted walls, which may be flat or curved. The grooves may have center slots or cutouts (gaps) for ease of manufacturing. Similarly, the matching ridged alignment portion 523 may include ridges having slanted walls, which may be flat or curved, and may have the tips of the ridges flattened or rounded for ease of manufacturing of ridge walls and for better matching to the corresponding grooved alignment portion 513. The moulding portions 512, 522 may be concave, convex, spherical, aspherical, conical, etc.

Figure 6:
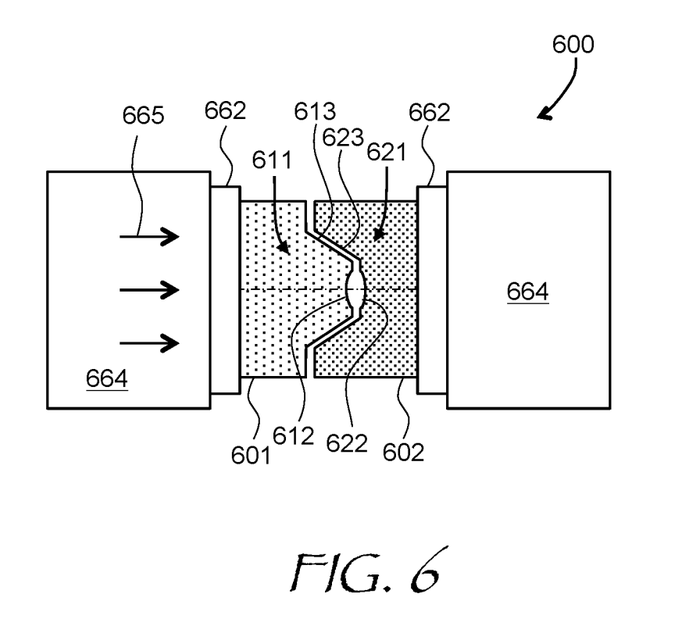
FIG. 6 is a side view of a moulding apparatus for moulding an optical component in accordance with the present disclosure.

Referring to FIG. 6, a moulding apparatus 600 for moulding an optical component includes a first mould 601 and a second mould 602 similar to the pair of moulds 101, 102 of FIG. 1. The first 601 and second 602 moulds of FIG. 6 are supported by a mould support 662. The first mould 601 has a first surface 611, e.g. a surface of revolution, and the second mould 602 has a second surface 621, e.g. a surface of revolution. The mould support 662 may include lockable holders i.e. chucks supporting the first 601 and second 602 moulds such that the first 611 and second 621 surfaces are coaxial and facing each other as shown. The first surface 611 of the first mould 601 includes a moulding portion 612 for moulding a first optical surface of the optical component, and an alignment portion 613 going around the moulding portion 612 for alignment with the second mould 602. Similarly, the second surface 621 includes a moulding portion 622 for moulding a second optical surface of the optical component opposing the first optical surface of the optical component, and an alignment portion 623 going around the moulding portion 622 for alignment with the first mould 601 via a contact with the alignment portion 613 of the first surface 611 of the first mould 601.

A press apparatus 664 may be configured for applying a force in a direction indicated by arrows 665, for pressing the first 601 and second 602 moulds against each other. As the first 601 and second 602 moulds are pressed against each other, the alignment portions 613 and 623 of the first 611 and second 621 surfaces engage each other in a direct physical contact, thereby centering the first 611 and second 621 surfaces, i.e. making them coaxial (for axially symmetric surfaces). As the first 611 and second 621 surfaces become centered/coaxial, their respective moulding portions 612 and 622 also become centered/coaxial. This causes the optical surfaces of the moulded optical component to be centered with the precision of the moulds 601 and 602 centering. Thus, not only the surface figures of the moulded optical component become tool-bound, but also the surface centering of the moulded optical component becomes tool-bound, which ensures repeatability as one moulded optical component is made after another using the same pair of moulds 601, 602. It is further noted that, since each one of the surfaces 611 and 621 may be obtained with a single setup of a lathe or a diamond turning machine (depending on an optical component to be moulded), the achievable centration of the moulds may be quite high.

In the embodiment shown in FIG. 6, the alignment portion 613 of the first surface 611 includes a concave truncated conical surface, and the alignment portion 623 of the second surface 621 includes a convex truncated conical surface matched to the concave truncated conical surface of the alignment portion 613 of the first surface 611. The alignment portions 613, 623 may have other shapes, including concentric triangular grooves matched to the concentric triangular ridges, concentric trapezoidal grooves matched to the concentric trapezoidal ridges, and the like.

The moulding portions of the first 611 and second 621 surfaces may be surrounded by the respective alignment portions. For example, the alignment surface portion may be disposed at a center of the surface, and multiple moulds for optical components may be disposed on the periphery of the surface. Alignment portions of each one of the first 611 and second 621 surfaces may include pre-defined offsets w.r.t. the corresponding moulding portions.

In the embodiment of FIG. 6, the moulding portions 612, 622 of the first 611 and second 621 surfaces, respectively, include concave surfaces of revolution, e.g. aspheric surfaces for making aspheric bi-convex lenses. It is to be understood that one or both of the moulding portions 612, 622 may also be convex spherical, aspherical, conical, anamorphic, freeform, etc. The moulding portions 612, 622 may also include concentric grooves or ridges of Fresnel lenses and diffractive optical elements e.g. diffractive lenses.

The first 601 and/or the second 602 molds can be made of various materials such as steel, brass, aluminum, etc. All or portions of the mold can be nickel plated or otherwise treated to assist with machining or performance. For instance, applying nickel to the moulding portions 612 and/or 622 may allow a better finish on the optical surfaces, while having the alignment portions, .g. cones, unplated steel could improve mold lifetime.

Figure 7A:
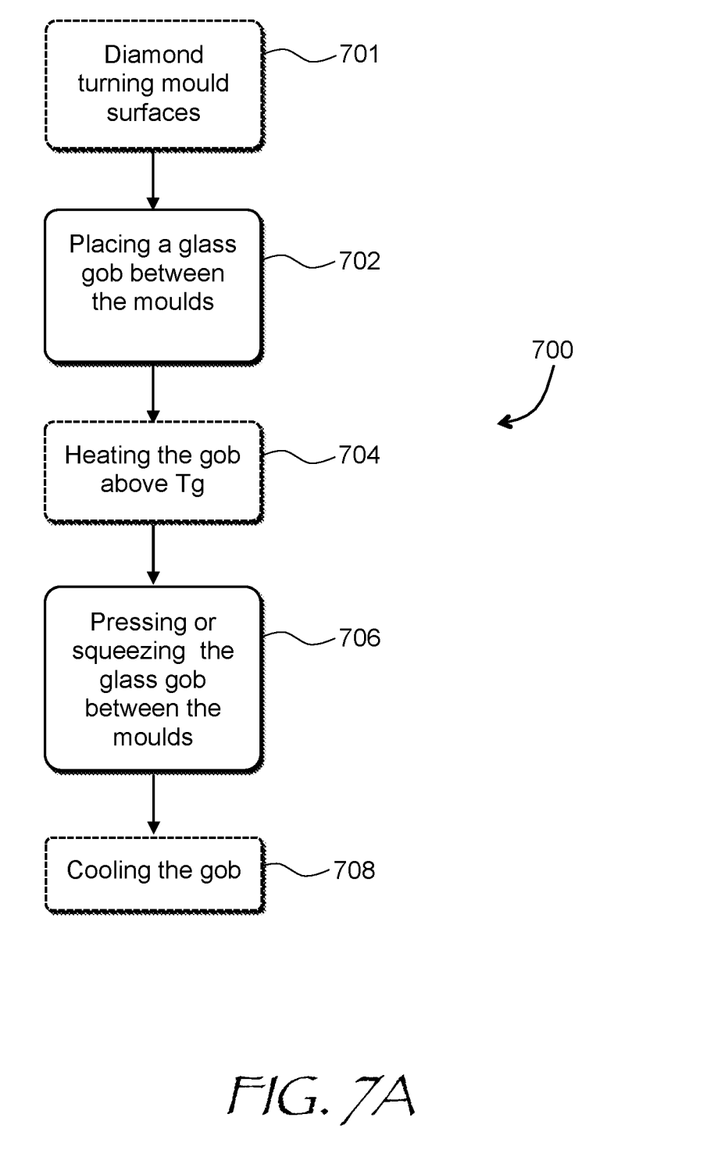
FIG. 7A is a flow chart of a method for manufacturing an optical component using a pair of moulds of the present disclosure pressing against a gob.

Turning to FIG. 7A, a method 700 for manufacturing an optical component may be performed e.g. using the moulding apparatus 600 of FIG. 6. The method 700 includes placing (702) an optical component preform between a moulding portion of a first surface of a first mould and a moulding portion of a second surface of a second mould, e.g. the moulding portion 612 of the first surface 611 of the first mould 601 and the moulding portion 622 of the second surface 621 of the second mould 602 of FIG. 6. The first surface 611 further includes the alignment portion 613 for alignment with the second mould 602, and the second surface 621 further includes the alignment portion 623 for alignment with the first mould 601. The optical component preform or gob may then be heated (FIG. 7A; 704) e.g. above its glass transition temperature Tg, to make the optical component preform or gob pliable enough to be shaped by pressing. The first 601 and second 602 moulds are then pressed or squeezed (706) by a press apparatus (e.g. the press apparatus 664 in FIG. 6) against each other, such that the alignment portions 613 and 623 of the first 611 and second 621 surfaces contact each other. By this action, the first 601 and second 602 moulds become aligned to each other, i.e. become coaxial ensuring that surfaces of the optical component being moulded are centered. The optical component preform or gob may then be cooled down (708). The moulds may then be separated to release the made optic.

The distance between the moulding portions 612 and 622 is defined by the mould geometry, i.e. by the shapes of the first 611 and second 612 surfaces. Thus, the pressing action may be pressure-controlled, that is, a controllable amount of pressure may be applied to ensure a good mechanical contact between the first 613 and second 623 alignment portions of the first 611 and second 612 surfaces, to ensure proper centering. The pressing action may also be displacement-controlled, although this is not necessary.

Since the precision of manufacturing of the optical component with the method 700 of FIG. 7A is tool-bound, the moulds may need to be manufactured with a level of precision corresponding to the required specifications of the optical component such as surface sag, center thickness, and centration. To achieve high tolerances of manufacturing, the first 611 and second 612 surfaces may be diamond turned, i.e. manufactured (701) by a diamond turning process, which is a mechanical machining process using a diamond cutting tool. The diamond turning may be followed by polishing, hardening, and/or coating e.g. plating of the first 611 and second 612 surfaces or their respective moulding/alignment portions, using suitable methods. In a coating process step, a protective layer may be applied to the first 611 and second 612 surfaces to protect the mould against wear, corrosion, friction, sticking of glass, and/or chemical reactions with the glass material of the preform.

Figure 7B:
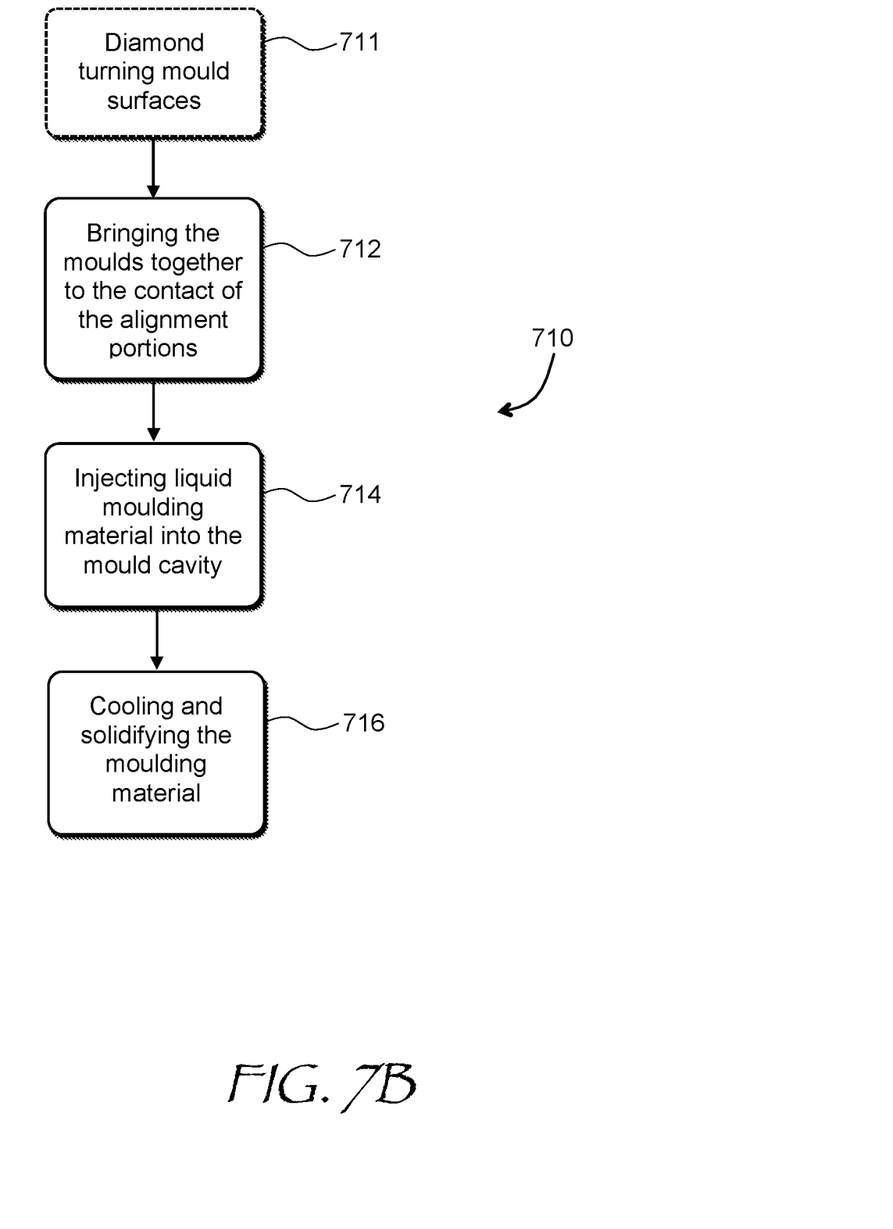
FIG. 7B is a flow chart of a method for manufacturing an optical component by injection moulding using a pair of moulds of the present disclosure.

Referring to FIG. 7B, a method 710 for manufacturing an optical component may be performed e.g. using an embodiment of moulding apparatus 600 of FIG. 6 suitable for injection moulding. The method 710 includes bringing the two moulds together (712) until physical contact between the respective alignment portions of the moulds. A liquid moulding material, such as a low-temperature glass or plastic, for example, may then be injected (714) into the mould cavity formed by the mould portions of the two moulds. The assembly is then allowed to cool down to solidify the moulding material (716). The moulds may then be separated to release the made optic.

Since the precision of manufacturing of the optical component with the method 710 of FIG. 7B is tool-bound, the moulds may need to be manufactured with a level of precision corresponding to the required specifications of the optical component such as surface sag, center thickness, and centration. To achieve high tolerances of manufacturing, the first 611 and second 612 surfaces may be diamond turned, i.e. manufactured (711) by a diamond turning process, which is a mechanical machining process using a diamond cutting tool. The diamond turning may be followed by polishing, hardening, and/or coating e.g. plating of the first 611 and second 612 surfaces or their respective moulding/alignment portions, using suitable methods. In a coating process step, a protective layer may be applied to the first 611 and second 612 surfaces to protect the mould against wear, corrosion, friction, sticking of glass, and/or chemical reactions with the glass material of the preform.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as a head-mounted display (HMD) connected to a host computer system, a standalone HMD, a near-eye display having a form factor of eyeglasses, a mobile device or computing system, or any other hardware platform capable of providing artificial reality content to one or more viewers.

Figure 8:
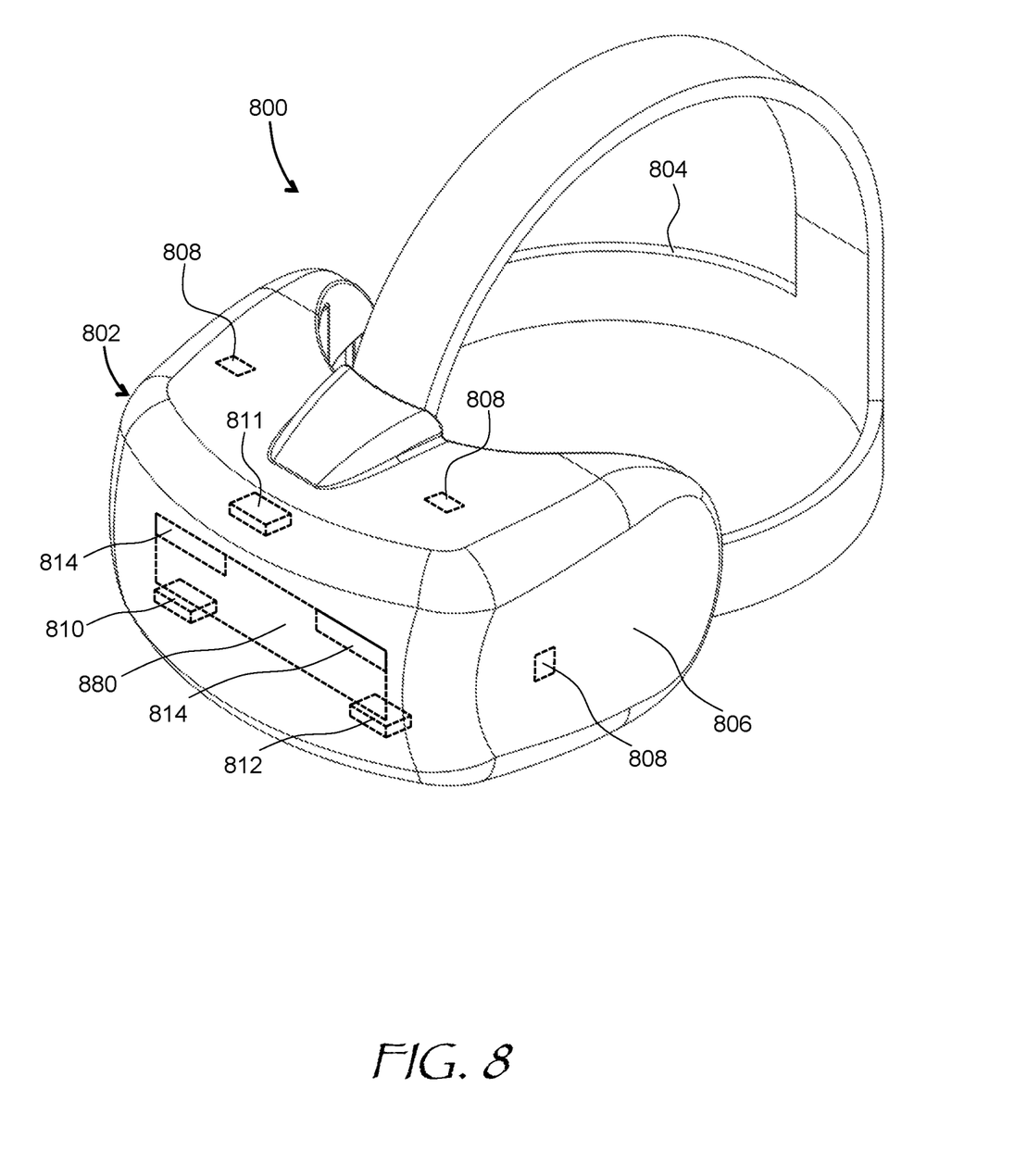
FIG. 8 is an isometric view of a head-mounted display including optical elements manufactured using the moulds of the present disclosure.

Referring to FIG. 8, an HMD 800 is an example of an AR/VR wearable display system which encloses the user's face, for a greater degree of immersion into the AR/VR environment. The function of the HMD 800 is to augment views of a physical, real-world environment with computer-generated imagery, and/or to generate the entirely virtual 3D imagery. The HMD 800 may include a front body 802 and a band 804. The front body 802 is configured for placement in front of eyes of a user in a reliable and comfortable manner, and the band 804 may be stretched to secure the front body 802 on the user's head. A display system 880 may be disposed in the front body 802 for presenting AR/VR imagery to the user. The display system 880 and other modules of the HMD 800 may include optical components manufactured using techniques and tools described herein. Sides 806 of the front body 802 may be opaque or transparent.

In some embodiments, the front body 802 includes locators 808 and an inertial measurement unit (IMU) 810 for tracking acceleration of the HMD 800, and position sensors 812 for tracking position of the HMD 800. The IMU 810 is an electronic device that generates data indicating a position of the HMD 800 based on measurement signals received from one or more of position sensors 812, which generate one or more measurement signals in response to motion of the HMD 800. Examples of position sensors 812 include: one or more accelerometers, one or more gyroscopes, one or more magnetometers, another suitable type of sensor that detects motion, a type of sensor used for error correction of the IMU 810, or some combination thereof. The position sensors 812 may be located external to the IMU 810, internal to the IMU 810, or some combination thereof.

The locators 808 are traced by an external imaging device of a virtual reality system, such that the virtual reality system can track the location and orientation of the entire HMD 800. Information generated by the IMU 810 and the position sensors 812 may be compared with the position and orientation obtained by tracking the locators 808, for improved tracking accuracy of position and orientation of the HMD 800. Accurate position and orientation is important for presenting appropriate virtual scenery to the user as the latter moves and turns in 3D space.

The HMD 800 may further include a depth camera assembly (DCA) 811, which captures data describing depth information of a local area surrounding some or all of the HMD 800. To that end, the DCA 811 may include a laser radar (LIDAR), or a similar device. The DCA 811 may include optical components manufactured using techniques and tools described herein. The depth information may be compared with the information from the IMU 810, for better accuracy of determination of position and orientation of the HMD 800 in 3D space.

The HMD 800 may further include an eye tracking system 814 for determining orientation and position of user's eyes in real time. The eye tracking system 814 may include optical components manufactured using techniques and tools described herein. The obtained position and orientation of the eyes also allows the HMD 800 to determine the gaze direction of the user and to adjust the image generated by the display system 880 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 802.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A pair of moulds for moulding an optical component, the pair of moulds comprising:
   a first mould comprising a first surface; and
   a second mould comprising a second surface;
   wherein the first surface comprises a moulding portion for moulding a first optical surface of the optical component, and a grooved alignment portion for alignment with the second mould, the grooved alignment portion extending around the moulding portion of the first surface and comprising concentric circular regions having at least one of triangular or trapezoidal cross-section; and
   wherein the second surface comprises a moulding portion for moulding a second optical surface of the optical component opposing the first optical surface thereof, and a ridged alignment portion for alignment with the first mould via a contact with the grooved alignment portion of the first surface, the ridged alignment portion extending around the moulding portion of the second surface and comprising concentric circular regions having at least one of triangular or trapezoidal cross-section.

2. The pair of moulds of claim 1, wherein the alignment portions of the first and second surfaces comprise surfaces of revolution.

3. The pair of moulds of claim 2, wherein the alignment portion of the first surface comprises a concave truncated conical surface, and wherein the alignment portion of the second surface comprises a convex truncated conical surface matched to the concave truncated conical surface of the alignment portion of the first surface.

4. The pair of moulds of claim 1, wherein the alignment portion of the first surface surrounding the moulding portion of the first surface is axially symmetrical about a first axis, and wherein the alignment portion of the second surface surrounding the moulding portion of the second surface is axially symmetrical about the first axis.

5. The pair of moulds of claim 1, wherein the moulding portions of the first and second surfaces comprise concave surfaces of revolution.

6. The pair of moulds of claim 1, wherein the moulding portions of the first and second surfaces comprise aspheric surfaces.

7. The pair of moulds of claim 1, wherein the alignment portions of the first and second surfaces comprise diamond turned surfaces.

8. The pair of moulds of claim 7, wherein the diamond turned surfaces comprise surfaces of revolution.

9. The pair of moulds of claim 1, wherein the grooved alignment portion has a triangular cross-section.

10. The pair of moulds of claim 1, wherein the ridged alignment portion has a triangular cross-section matching the triangular cross-section of the grooved alignment portion.

11. The pair of moulds of claim 1, wherein the moulding portions of the first and second surfaces comprise arrays of concave recesses.

12. A moulding apparatus for moulding an optical component, the moulding apparatus comprising:
   a first mould comprising a first surface; and
   a second mould comprising a second surface;
   a mould support for supporting the first and second moulds such that the first and second surfaces are facing each other; and
   a press apparatus for pressing the first and second moulds against each other;
   wherein the first surface comprises a moulding portion for moulding a first optical surface of the optical component, and a grooved alignment portion for alignment with the second mould, the grooved alignment portion extending around the moulding portion of the first surface and comprising concentric circular regions having at least one of triangular or trapezoidal cross-section; and
   wherein the second surface comprises a moulding portion for moulding a second optical surface of the optical component opposing the first optical surface thereof, and a ridged alignment portion for alignment with the first mould via a contact with the grooved alignment portion of the first surface, the ridged alignment portion extending around the moulding portion of the second surface and comprising concentric circular regions having at least one of triangular or trapezoidal cross-section.

13. The moulding apparatus of claim 12, wherein the alignment portions of the first and second surfaces comprise surfaces of revolution.

14. The moulding apparatus of claim 13, wherein the alignment portion of the first surface comprises a concave truncated conical surface, and wherein the alignment portion of the second surface comprises a convex truncated conical surface matched to the concave truncated conical surface of the alignment portion of the first surface.

15. The moulding apparatus of claim 12, wherein the alignment portion of the first surface surrounding the moulding portion of the first surface is axially symmetrical about a first axis, and wherein the alignment portion of the second surface surrounding the moulding portion of the second surface is axially symmetrical about the first axis.

16. The moulding apparatus of claim 12, wherein the moulding portions of the first and second surfaces comprise concave surfaces of revolution.

17. The moulding apparatus of claim 12, wherein the moulding portions of the first and second surfaces comprise aspheric surfaces.

18. The moulding apparatus of claim 17, wherein the aspheric surfaces comprise surfaces of revolution.

* * * * *